(12) United States Patent
Langevin et al.

(10) Patent No.: US 7,965,725 B2
(45) Date of Patent: Jun. 21, 2011

(54) HYPER-RING-ON-CHIP (HYROC) ARCHITECTURE

(75) Inventors: Michel Langevin, Ottawa (CA); Charles Pilkington, Ottawa (CA)

(73) Assignee: STMicroelectronics, Inc., Coppell, TX (US)

( * ) Notice: Subject to any disclaimer, the term of this patent is extended or adjusted under 35 U.S.C. 154(b) by 925 days.

(21) Appl. No.: 11/370,325

(22) Filed: Mar. 8, 2006

(65) Prior Publication Data

US 2006/0268909 A1 Nov. 30, 2006

Related U.S. Application Data

(60) Provisional application No. 60/685,962, filed on May 31, 2005.

(51) Int. Cl.
*H04L 12/28* (2006.01)
*H04L 12/56* (2006.01)
(52) U.S. Cl. .................... 370/405; 370/535
(58) Field of Classification Search .............. None
See application file for complete search history.

(56) References Cited

U.S. PATENT DOCUMENTS

| | | | | |
|---|---|---|---|---|
| 4,742,511 | A * | 5/1988 | Johnson | 370/406 |
| 4,872,159 | A * | 10/1989 | Hemmady et al. | 370/352 |
| 4,933,933 | A * | 6/1990 | Dally et al. | 370/406 |
| 5,157,692 | A * | 10/1992 | Horie et al. | 375/260 |
| 5,168,492 | A | 12/1992 | Beshai et al. | |
| 7,633,940 | B1 * | 12/2009 | Singh et al. | 370/389 |
| 2004/0213251 | A1 * | 10/2004 | Tran et al. | 370/395.1 |
| 2004/0250046 | A1 * | 12/2004 | Gonzalez et al. | 712/11 |
| 2005/0114565 | A1 | 5/2005 | Gonzalez et al. | |

OTHER PUBLICATIONS

Newton's Telecomm Dictionary—ADM definition.*
NIIT, Special Edition Using Optical Networks, Dec. 14, 2001, Que.*
"ClearConnect Bus High Performance On-Chip Interconnect," ClearSpeed Technology, product brochure 2003.
"Using the ClearConnect Bus, Application Note," ClearSpeed Technology, product overview, Feb. 3, 2003.
Link, et al., "Network-on-Chip (NoC) Architectures: A Resource-Constrained Perspective," Department of Computer Science & Engineering, The Pennsylvania State University, University Park, PA, date unknown.

(Continued)

*Primary Examiner* — Daniel J Ryman
*Assistant Examiner* — Jae Y Lee
(74) *Attorney, Agent, or Firm* — Lisa K. Jorgenson; Andre M. Szuwalski

(57) ABSTRACT

A network-on-chip interconnects an array of integrated circuit resources. The network-on-chip includes at least one vertical communications ring per column of the array and at least one horizontal communications ring per row of the array. A network interface is associated with each resource of the array and operates to interface the communications rings with each other and the resource with the communications rings. A ring hop is provided at each network interface and for each communications ring thereat. Each ring hop functions as an add/drop multiplexer with respect to inserting packets onto the associated communications ring and extracting packets from the associated communications ring. Packets are communicated over the vertical/horizontal rings using a logical transport channel that flows in a cyclic manner through the communications ring without interruption. A back pressure mechanism allows the ring hops on a given communications ring to address overflow conditions on that ring, and a request mechanism allows the ring hops on a given communications ring to request use of that ring to carry a packet communication.

13 Claims, 3 Drawing Sheets

OTHER PUBLICATIONS

Hsin-Chou Chi, et al., "Design and Implementation of a Routing Switch for On-Chip Interconnection Networks," Advanced System Integrated Circuits 2004; Proceedings of 2004 IEEE Asia-Pacific Conference on Fukuoka, Japan, Aug. 4-5, 2004, Piscataway, New Jersey, USA, IEEE, US Aug. 4, 2004, pp. 392-395; XP010734054; ISBN: 0-7803-8637-X.

Daily, et al., "Route Packets, Not Wires: On-Chip Interconnection Networks," Proceedings of the 38th Annual Design Automation Conference (DAC), Las Vegas, NV, Jun. 18-22, 2001, Proceedings of the Design Automation Conference, New York, NY; ACM, US, vol. CONF.38, Jun. 18, 2001, pp. 684-689; XP010552473; ISBN: 1-58113-297-2.

European Search Report, EP 06 25 2724, dated May 22, 2007.

* cited by examiner

HYPER-RING-ON-CHIP (HYROC) ARCHITECTURE

PRIORITY CLAIM

This application claims the benefit of U.S. Provisional Application for Patent No. 60/685,962, filed May 31, 2005, the disclosure of which is hereby incorporated by reference.

BACKGROUND OF THE INVENTION

1. Technical Field of the Invention

The present invention relates to a Network-on Chip (NoC) for use in connecting different subsystems of a System-on-Chip (SoC) using a rotation principle with an extension of a basic ring architecture.

2. Description of Related Art

A Network-on-Chip (NoC) is a System-on-Chip (SoC) component used to connect different sub-systems of the SoC. For example, an NoC can be used to connect a set of embedded processors and other processing components with a set of memories and Input/Output (I/O). A bus can be considered as a low-cost, low-bandwidth NoC, while a full cross-bar can be considered a high-cost, high-bandwidth NoC.

A 2D Torus architecture is disclosed in W. J. Dally and B. Towles, "Route Packets, Not Wires: On-Chip Interconnection Networks", Design Automation Conference (DAC), Jun. 18-22, 2001, Las Vegas, Nev., USA, pp. 684-689. The architecture is a variant of a 2D Mesh topology, and uses a switch at each resource, where the switches are connected to form a ring topology in each direction. Each switch is composed of a four output buffer, one output for each direction, where traffic can be routed in any direction, without following a particular routing scheme.

As will be described in more detail herein, the present invention comprises a Hyper-Ring-on-Chip (HyRoC) architecture that is based on generally the same topology as the 2D Torus. However, one difference between the two architectures is that the switching at each hop in the HyRoC Architecture is configured as add-drop multiplexing in each direction. This results in a different scheduling scheme than is present with the 2D Torus implementation of the prior art. When a message is being transferred in one direction (ring) with the HyRoC Architecture, it will not be blocked at a hop before reaching its destination hop relative to that current ring. Furthermore, the use of multiple parallel channels is proposed in the HyRoC Architecture of the present invention to minimize internal blocking (internal blocking occurs when traffic for a given source-destination path on a ring is blocking traffic for an independent source-destination path). The basic principle of the single ring with multiple parallel channels is derived from the rotator-switch architecture disclosed by M. E. Beshai and E. A. Munter, "Rotating-Access ATM-STM Packet Switch, U.S. Pat. No. 5,168,492. This architecture target telecommunication application based on multi-chip implementation, and is using a complex scheduler to maximize resource utilization, resulting in a relatively large routing latency. In our case, for the HyRoC architecture, we target a simpler on-chip implementation using a simpler scheduler to minimize the routing latency. Furthermore, we proposed a multi-dimensional ring implementation, in particular, a 2D extension of bidirectional rings.

A prior art ClearConnect architecture (ClearSpeed Technology ClearConnect Bus, www.clearspeed.com) discloses a basic multiplexer block which can be connected to form a chain topology, but not a ring topology. Although bidirectional chains are supported, there is no support for multiple channels, nor is there support for multiple dimensions, such as a 2D dimension. As will be described in more detail herein, the scheduling and routing mechanism of the HyRoC Architecture is very different from the ClearConnect Bus as well.

SUMMARY OF THE INVENTION

The Hyper-Ring-on-Chip (HyRoC) of the present invention is a Network-on-Chip (NoC) architecture wherein the transfer of information follows a rotation principle as in the case of a basic ring. The HyRoC architecture, however, is an extension of the basic ring architecture and includes features such as:

multiple token: this allows concurrent ring access from different hop interfaces;

parallel ring channels: this serves to minimize internal blocking; and two (and more) dimension rings: this serves to increase scalability and minimize transfer latency.

A two dimension HyRoC in accordance with an embodiment of present invention can be implemented naturally as a 2D layout of cells. Furthermore, the implementation can include features such as:

the rotation mechanism can be physically implemented using either shift-registers or commutators;

duplex ring channels can be used to minimize transfer latency by a factor of two; and a reservation mechanism can be used to support different traffic types.

In accordance with an embodiment of the invention, a network-on-chip for interconnecting an array of resources comprises at least one vertical communications ring per column of the array, at least one horizontal communications ring per row of the array, a network interface associated with each resource of the array for interfacing the communications rings with each other and the resource with the communications rings, and a ring hop at each network interface and for each communications ring thereat, each ring hop functioning as an add/drop multiplexer with respect to inserting packets onto the associated communications ring and extracting packets from the associated communications ring.

In accordance with another embodiment, a network-on-chip for interconnecting an array of resources comprises a least one vertical communications ring per column of the array, a least one horizontal communications ring per row of the array, wherein each communications ring cycles at least one logical transport channel for carrying packets, and a ring interface at each resource of the array and for each communications ring thereat that functions as an add/drop multiplexer so as to insert packets into the cycling logical transport channel of the communications ring and extract packets from the cycling logical transport channel of the communications ring.

In accordance with yet another embodiment, a method is presented for controlling access to a network-on-chip which interconnects an array of resources and includes a least one vertical communications ring per column of the array and a least one horizontal communications ring per row of the array. The presented method comprises, at each resource location in the array, and for each communications ring thereat, performing add/drop multiplexing to insert packets for transport by the communications ring to other resource locations in the array and extract packets transported by the communications ring from other resource locations in the array.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

The HyRoC architecture in accordance with embodiments of the present invention merges the advantage of a cell-based 2D layout implementation (such as with a 2D Torus of the prior art) with the advantage of a simple routing and control flow of a basic ring in which higher-bandwidth can be provided by combining parallel rings.

Figure 1:
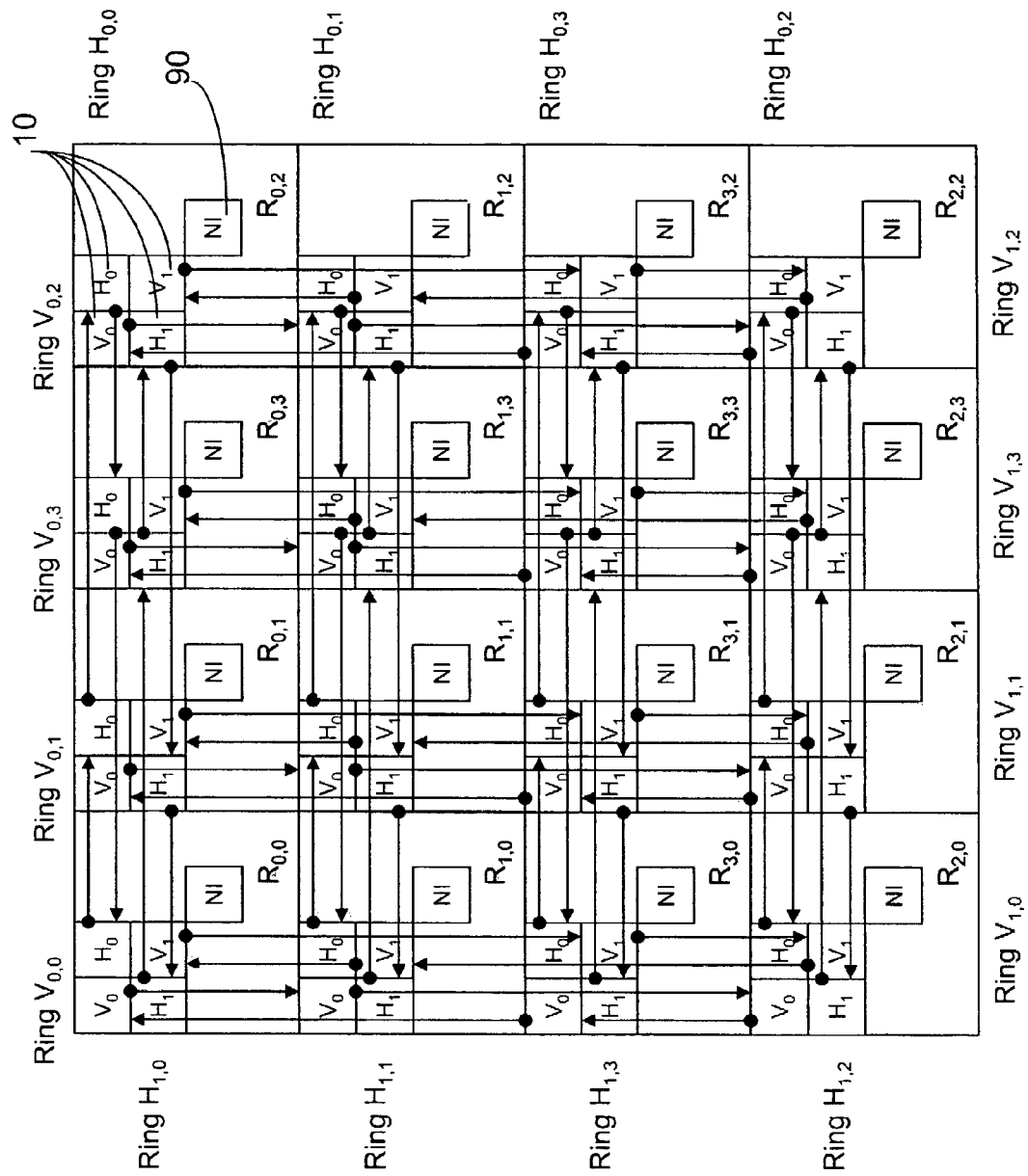
FIG. 1 is topology diagram illustrating the Hyper-Ring-on-Chip (HyRoC) architecture in accordance with an embodiment of the present invention for connecting N×M resources R (and in particular shows a HyRoC topology example composed of 16 resources, 8 horizontal rings and 8 vertical rings)

The architecture of the HyRoC will now be described beginning with a high level view. The topology of the HyRoC architecture for connecting N×M resources R is shown in FIG. 1, where resources R are distributed as an array of N rows and M columns. Without loss of generality, FIG. 1 assumes N=M=4, for a total of 16 resources R connected by the NoC. The resources are numbered $R_{i,j}$, for i=0 to N−1, and j=0 to M−1.

Each resource R is connected with the Network-on-Chip (NoC) via an NoC Interface (NI) 90 which behaves as a multiplexer selectively connecting the resource R with four independent rings, via a corresponding ring hop (RH) 10, comprising: two rings oriented in the horizontal direction, H0 and H1, and two rings oriented in the vertical direction, V0 and V1. The ring paths are shown schematically in FIG. 1 as arrows circulating vertically/horizontally and interfaced with the array of resources R through the NoC interfaces NI. The physical layout of a single ring is shown in exemplary fashion in the bottom of FIG. 2. The HyRoC architecture provides the NoC for an integrated circuit, or perhaps for some other type of system, wherein plural circuit resources R need to be interconnected for data communication.

In accordance with an embodiment of the present invention, an NoC topology supporting N×M resources is composed of 2×N horizontal rings, H0,i and H1,i, for i=0 to N−1, and 2×M vertical rings, V0,j and V1,j, for j=0 to M−1, where resource $R_{i,j}$ is connected with rings H0,i, H1,i, V0,j, and V1,j, via its NI.

Figure 2:
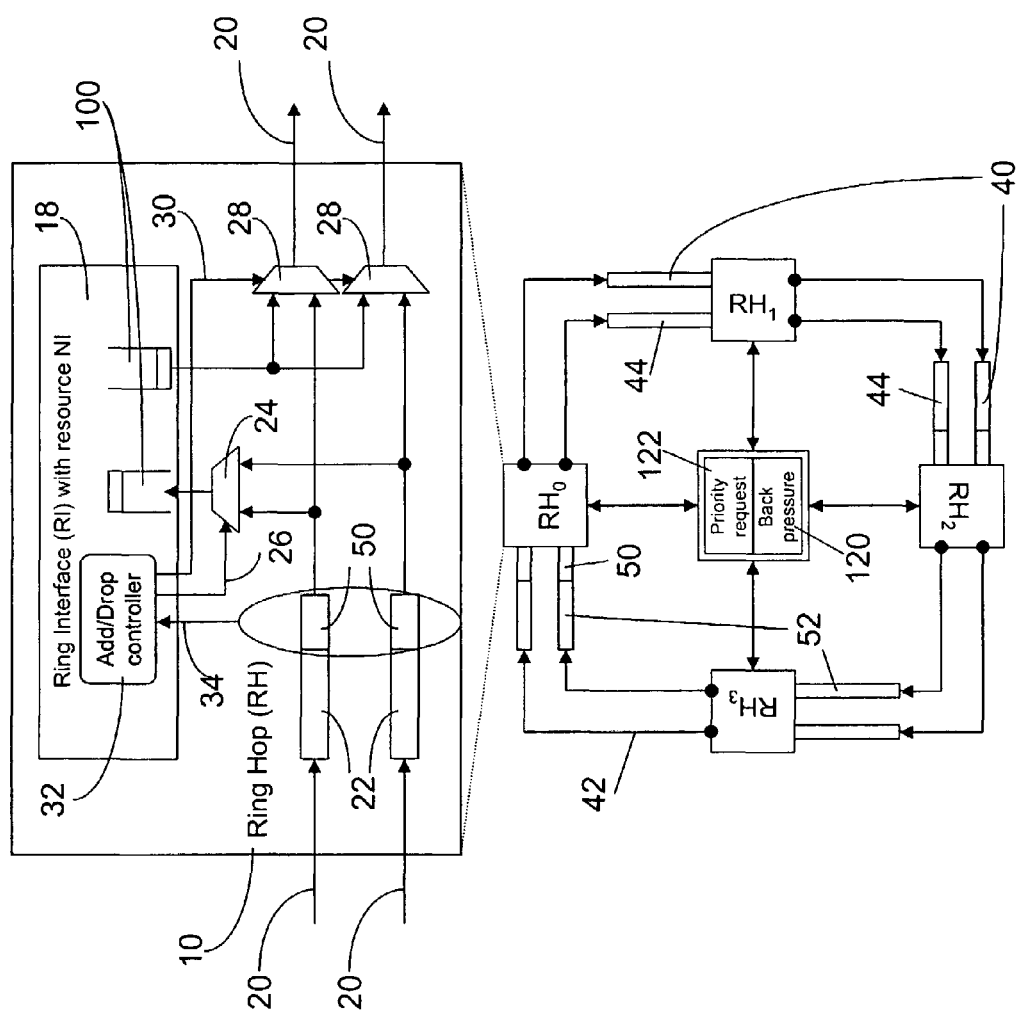
FIG. 2 shows an example of a four-hop ring composed of two physical channels, where each physical channel is supporting two transport channels, and each transport channel is composed of two segments, thus spreading two hops.

Each horizontal ring is composed of M hops, while each vertical ring is composed of N hops. The rotation mechanism with respect to ring communication can be physically implemented using either shift-registers or commutators and an exemplary physical interconnection of the NI's/RH's for a single ring is shown in FIG. 2.

This topology is similar with the 2D Torus topology discussed above. In particular, the topology can be implemented as a layout based on a folded VLSI technique where the connection needs to span at most two resources, as shown in FIG. 1. The resource numbering (shown in FIG. 1) follows the logical connection order, and not the physical connection order (shown in FIG. 2). It will be noted that duplex ring channels can alternatively be used to minimize transfer latency by a factor of two. In the case of the 2D Torus of the prior art, each switch is a 5×5 cross-bar (between east port, west port, north port, south port and resource port), while for the HyRoC Architecture, each switch is composed of four ring hops (RHs) relating to the four independent rings accessible at that location in the array. This difference is significant, and results in differences over the prior art with respect to how routing decisions are performed and how packets flow through the NoC.

A ring-hop (RH) 10 as shown in FIG. 1 controls the insertion and extraction of data traffic flowing on the corresponding ring. Reference is now made to FIG. 2 which illustrates, at the top of the figure, a block diagram of a single ring hop (RH) 10 for one physical ring available at a given array location. Each RH 10 includes a Ring Interface (RI) 18 to connect with the resource NI 90 (FIG. 1). Through this interface, data (such as packets) is passed to the RH from the resource NI or received from the resource NI for delivery to the RH. FIFOs 100 are used to store packets between the NI and RH, in both the input and output directions. The RH illustrates the presence of two physical channels 20 which form a given ring, which in this case could comprise either a vertical or horizontal ring. A segment buffer 22 is associated with each physical channel 20 at the input to the RH. An extraction (or drop) multiplexer 24 is coupled to the physical channels 20. Responsive to a control signal 26, the multiplexer 24 can remove data from either of the physical channels 20 and pass that data to the RI 18 with the resource NI. An insertion (or add) multiplexer 28 is provided for each physical channel 20. Responsive to a control signal 30, each multiplexer 28 can insert data from the RI 18 with the resource NI to its associated physical channel 20. An add/drop controller 32 functions to issue the control signals 26 and 30 as needed to control the data add/drop operations performed by the multiplexers 24 and 28; the decision is performed from the value of the packet segment header 50 part of the packet segment buffer 22 extracted using connection 34. At each resource NI, one RH is needed for each connected ring. Thus, in the exemplary NoC of FIG. 1, four RH's, one for each included ring (H0, H1, V0, V1), are provided at each resource NI (i.e., at each array location) in order to support data/packet add/drop operations for each ring.

As mentioned previously, FIG. 2 further illustrates a single four hop ring. This illustrated ring is exemplary in nature and can include more or less hops as desired and depending on the size of the array. Additionally, it will be noted that the ring can either be a vertical ring or a horizontal ring. Duplexing of the ring is further a possibility.

A discussion of packet flow within the HyRoC Architecture is now provided. Information is transferred between two resources R through a logical channel, which characterizes the type of traffic it is carrying. Characteristics considered in the HyRoC architecture include:

routing-scheme: this indicates if the packet must flow first horizontally or vertically, using shortest or longest rings (path), and if the packet order must be maintained; and priority: two priorities are considered, high and low (best-effort), but this can be extended to other priority levels and further encompass the concept of scheduling access to the rings for communication.

The information is transferred as fixed-size packets. The resource forwards to the rings, and retrieves from the rings, packets using its own NoC Interface (NI) and the associated ring hops RHs for the rings passing through that array location. Based on the traffic type and target destination of a packet, the NI operates to forward the packet to the Ring Interface (RI) 18 (at the ring hop RH, see FIG. 3) of one of the 4 rings associated with the resource. The packet will be added by controller 32 and multiplexer 28 to a ring and will travel inside one or two rings before reaching its destination resource. In this context, it will be recognized that four patterns for packet travel between resources are possible:

1) only a horizontal ring;
2) only a vertical ring;
3) a horizontal ring followed by a vertical ring; and
4) a vertical ring followed by a horizontal ring.

The NI is also responsible for retrieving the packet which arrives at a RI 18 with a resource NI, and to forward that packet to the resource R, or to another RI 18 (at another ring hop RH at that same array location, see FIG. 3), in case the packet has not yet reached its intended destination. In the latter case, the NI behaves as a bridge between two rings using two associated ring hops (RHs). In support of this operation, the packet is removed from the ring by controller 32 and multiplexer 24 of one ring hop RH. In the event transport in another ring is needed, for the bridging operation mentioned above, the controller 32 and multiplexer 28 (in a different ring hop RH also associated with the NI at the array location) will add the packet to a different ring.

Buffering is used inside the NI (to interface with the resource) and RI 18 of the RH to control the flow of packets. A single first-in-first-out (FIFO) buffer can be used, or multiple FIFO buffers can be used. This choice is dynamically and/or architecturally selectable based on traffic-type and potentially on target destination.

Each ring transports the fixed size packets using a transport channel 40. A transport channel is a logical entity rotating inside the ring, from ring-hop to ring-hop in a hop by hop fashion. The logical transport channel 40 content starts with a header 50 containing information as control status, hop-target tag, priority and traffic-type of a packet. The header 50 is followed by a fixed-size payload 52 that can contain user data, depending on the status.

The transport channel 40 flows in a cyclic manner through the ring, without interruption. At each hop (RH location associated with an NI and resource R) of the transport channel 40:

a packet is dropped (see, RH structure 24/32) if the transport channel contains a packet which has reached its destination (either for the resource associated with that hop, or if the packet must change rings in order to reach its destination); and a packet can be added (see, RH structure 28/32) if the transport channel is free. In this way, it will be recognized that each ring hop RH behaves as an add/drop multiplexer of packets over its transport channel for the associated ring.

The transport channel 40 is transferred over a fixed number of physical connections 42 between hops, thus forming a physical channel 20 for the ring. As shown in FIG. 2, each ring may include more than one physical channel 20.

Depending on the size of the transport channel 40, and the number of physical connections 42 for the physical channel 20, the transport channel can be composed of multiple segments 44, each of the same size. In such a case, the transport channel 40 is likely to be spread over (or otherwise cover) multiple hops at one time (as is shown in FIG. 2 where each transport channel 40 includes two segments 44, with the first segment including the header 50 and a first part of the payload 52, and the second segment including a second part of the payload 52).

There could be many distinct transport channels 40 circulating back-to-back on the physical channel 20, and they can potentially be of different size. The preferred embodiment assumes the transport channels 40 are all of the same size.

For instance, in the case of a four hop implementation (as shown in the example of FIG. 1), the ring can be configured with either:

one transport channel composed of four segments (each transport channel is thus spread over four hops);

two transport channels composed of two segments (each transport channel is thus spread over two hops) as shown in the ring example of FIG. 2; or four transport channels composed of one segment (each transport channel is thus spread over one hop).

A kind of worm hole transfer mechanism is used to transport a packet inside a transport channel 40 composed of multiple segments 44. It will be noticed, however, that the packet (worm) cannot be stopped once the transfer through the ring is started. That is, when a ring hop (RH) is adding the first segment of a packet in the first segment 44 of a transport channel 40, which includes the header 50, it must insert the remaining segments of the packet in the following segments 44 of the transport channel 40. The same mechanism is used when dropping a packet from a transport channel 40 (i.e., when a ring hop is dropping the first segment of a packet from the first segment 44 of a transport channel, based on the header 50 value, it must retrieve the remaining segments of the packet from the following segments 44 of the transport channel 40).

As soon as the first segment 44 of the transport channel 40 is free, the ring hop can start adding a packet in this transport channel 40. This means that at a given time, the transport channel 40 can potentially be composed, within its segments 44, of multiple segments from different packets.

A ring can be composed of multiple parallel physical-channels 20. This is illustrated in an exemplary manner in FIG. 2 which shows a ring comprising two parallel physical channels. To allow simple add/drop decisions to be performed at each hop, the following constraints are assumed:

1. the same number of physical connections per physical channel 20;
2. the same number of transport channels 40 per physical channel 20;
3. the headers 50 of the transport channels 40 are aligned (this is also shown in FIG. 2);
4. at most one packet can be added to any of the transport channels 40 at each hop;
5. at most one packet can be dropped from any of the transport channels 40 at each hop; and
6. all the aligned transport channels 40 are carrying packets for different target-hops RHs.

Constraints 1 and 2 are sufficient to satisfy constraint 3. Constraint 3 can be implemented using a framing signal control by one hop, say hop 0. Constraint 6, together with constraints 4 and 5, guarantees packet ordering between any pair of source target hop path.

Thus, FIG. 2 shows an example of a four-hop ring composed of two physical channels, where each physical channel is supporting two transport channels 40, and each transport channel is composed of two segments 44, thus having a spread over two hops (RHs).

The bandwidth of the Add/Drop connection is equal to the bandwidth of the (physical or transport) channel BC, while the bandwidth of the ring BR is equal to K·W·BC, where K is the number of ring hops and W is the number of physical channels. That is, in FIG. 2, BR=8BC.

Some of these constraints can be relaxed, resulting in a more complex add/drop multiplexer. For instance:

1. different physical channels can carry different transport channel sizes; this would allow some ring physical channels to transport larger packet sizes than with other rings; and
2. more than one packet can be added/dropped at each hop; this would allow the hop to inject and receive more than one packet at a time.

Next, a description of the scheduling strategy used to control traffic flow is presented.

The packet scheduling and control flow is distributed between the NoC interface (NI) and the Ring Hop (RH).

The basic requirements of the NoC Interface (NI) are:

1. to accept a packet from the resource and forward it to the appropriate ring interface 18 of the proper RH, based on the routing scheme;

2. to retrieve a packet from each ring interface 18, and forward it to the resource R if it has reached its destination, and otherwise, forward it to the appropriate ring interface 18 (of another RH), based on the routing scheme.

Figure 3:
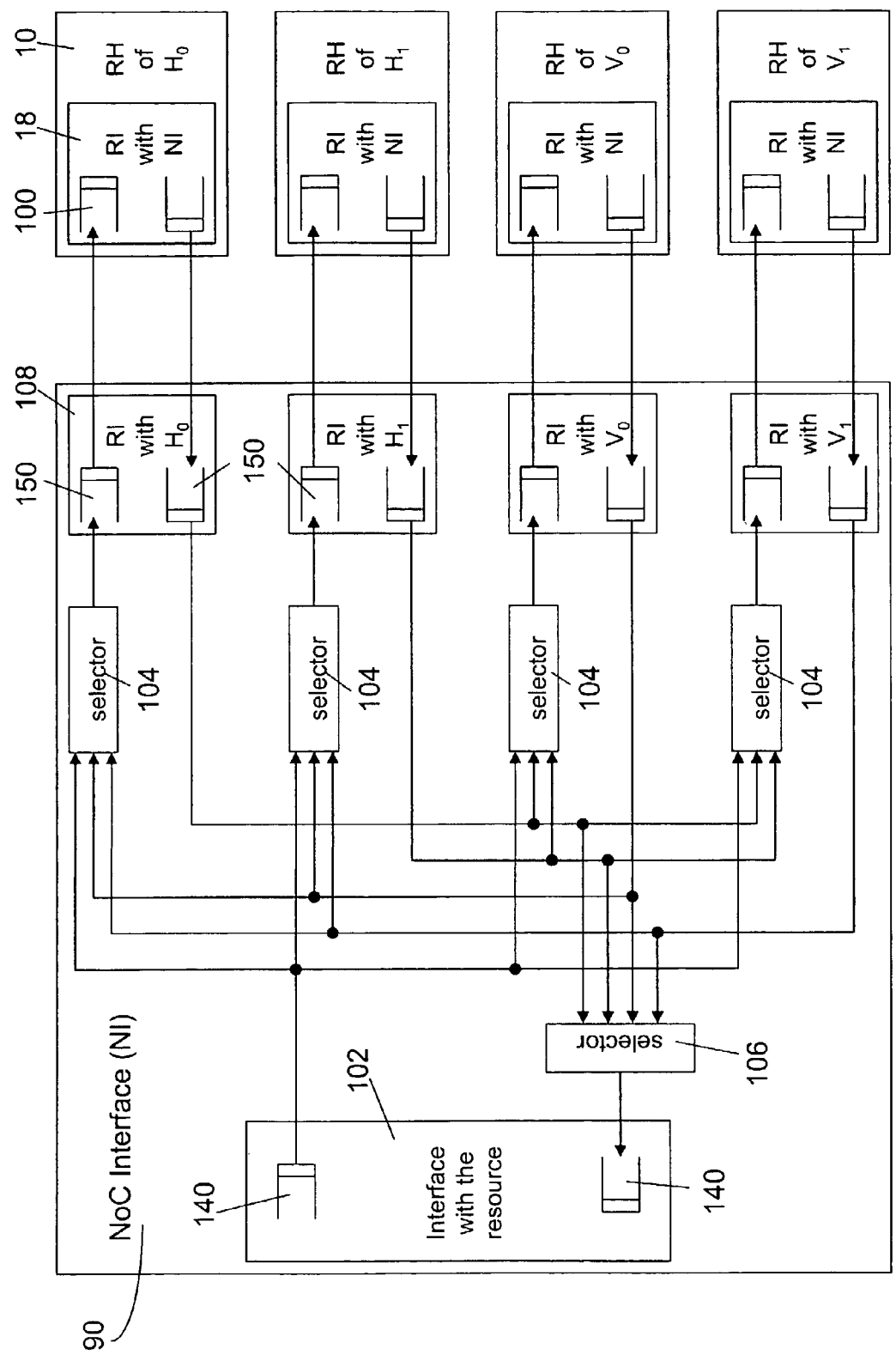
FIG. 3 shows a possible implementation of the NoC Interface component connecting the resource with four rings.

Reference is now made to FIG. 3 wherein there is shown a block diagram of a possible implementation of the NI 90. Buffer FIFOs 140 are used to store packets at the interface 102 between the resource R and the NI. Buffer FIFOs 150 are also provided to store packets at the interface 108 between the NI and the ring hops RH 10 associated with each of the four rings H0, H1, V0 and V1. For each ring, a selector 104 is used to select a packet from three sources, depending on what is the target ring:

for the H0 ring: packets can be from the resource itself, or from rings V0 or V1;

for the H1 ring: packets can be from the resource itself, or from rings V0 or V1;

for the V0 ring: packets can be from the resource itself, or from rings H0 or H1; and for the V1 ring: packets can be from the resource itself, or from rings H0 or H1.

Similarly, a selector 106 is used to select a packet from one of the four rings H0, H1, V0 or V1 to be returned to the resource R.

Notice that the FIFOs 140 and 150 can be restricted to a size of one, with possible impact on the NoC performance. Furthermore, a FIFO 100, 140 or 150 can be logically composed of multiple FIFOs, these can be associated with Quality of Service (QoS), or ring target. Lastly, it will be noted that the FIFO 150 is completely optional (it can be omitted, or controlled to be of size 0).

The routing operation is based on the routing-scheme associated with the packet. If out-of-order handling is supported, the packet could be routed to the less congested path.

The basic requirements of the Ring Hop (RH) are:
1. to accept packets from the NI;
2. to send back packets for the NI;
3. to extract (drop) packets from the ring transport channels; and
4. to insert (add) packets to the ring transport channels.

Reference is once again made to FIG. 2. As describer earlier, the top of FIG. 2 shows a possible implementation of the RH. FIFOs 100 are used to store packets between the NI and RH. The add/drop functionality is based on the packet headers 50 flowing in the transport channel 40.

In the case of a drop, if the header 50 corresponds to a packet having reached its RH target, the packet from the corresponding transport channel is extracted by controller 32 and multiplexer 24 and stored in the FIFO 100 to be sent back to the NI. In that case, the header status becomes free.

In the case of add, the controller 32 and multiplexer(s) 28 of the RH can insert a packet for a destination X if there is a free channel, and if there is no channel already transporting a packet for the destination X. The decision is again performed from the header 50 value.

The RH must store the current value of the channel header 50, incoming and outgoing, in order to extract and insert accordingly the packet.

A back-pressure mechanism 120 can be used to avoid overflow of FIFOs 100. Each RH can signal to the other RH of the same ring that its outgoing FIFO is almost full. Thus, a ring hop cannot insert a packet for a destination X if the corresponding signal is raised. The size of the FIFO and threshold value to raise the signal is dependant on the maximal number of in flight packets in the transport channel 40.

A request mechanism 122 can be used to support high-priority traffic. Each RH can signal to the other RHs of the same ring that a high-priority packet must be sent. Thus, a ring hop cannot insert a low-priority packet if one of the request signals of the other RH is raised. The request should be raised only after a number of unsuccessful insertions of a high-priority packet. A modification or enhancement of the request mechanism could further implement and support a reservation mechanism with respect to different traffic types.

Next, some general guidelines are presented regarding a physical implementation of the invention. A possible implementation of the HyRoC architecture is described. It will be noted, however, that many variants in the implementation are possible. The implementation example below assumes an 8×8 HyRoC configuration.

With respect to packet format, the Packet Header contains the following fields: 1) Status: free, busy; 2) Priority: high/low; 3) Routing scheme: horizontal first, vertical-first, etc.; 4) Target hop: for current ring; 5) Source resource: global; and 6) Destination resource: global.

With respect to packet format, the packet payload contains the following user data: 1) Command: Read, Write, others; 2) Address: for read/write command; and 3) Data: for write command.

Overall, the packet size can be in the range of 96 bits.

With respect to the data path, assume all the physical channels have the same bit width. For example, the following bit widths could be used: 96 bit (8 transport channels, each of 1 segment, per physical channel); 48 bit (4 transport channels, each of 2 segment, per physical channel); 24 bit (2 transport channels, each of 4 segments, per physical channel); and/or 12 bit (1 transport channel of 8 segments, per physical channel).

Each ring is preferably composed of two physical channels.

With respect to the control path, each Ring Hop and NoC Interface can be implemented in the manner generally shown in FIGS. 2 and 3, respectively, where one FIFO 100 per priority can be used. So, for each Ring Hop (see, the top of FIG. 2), the Ring Interface (RI) 18 includes two FIFOs 100 in the input direction as well as two FIFOs 100 in the output direction. For the case of the Ring Interface 90, two FIFOs 140 and 150 for each of the input and output direction can be used at the interface with each of the four rings 108, as well as with the resource 102. The size of the FIFOs 140 and 150 can be restricted to a size of one packet.

To minimize the size of FIFO 100, one back-pressure signal (using mechanism 120) per priority can be used per resource per direction to inform other resource to avoid sending packet of the given priority to the given resource. Assuming four transport channels per physical channel, and using a threshold of four packets, the size of the FIFO 100 can be limited to 8.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A network-on-chip for interconnecting an array of resources, comprising:
   a physical vertical communication ring for each of M columns of the array, each physical vertical communication ring supporting at least one circulating vertical logical transport channel for conveying a packet, wherein M>2;
   a physical horizontal communication ring for each of N rows of the array, each physical horizontal communication ring supporting at least one circulating horizontal logical transport channel for conveying a packet, wherein N>2;
   a network interface associated with each resource of the array and operable to interface the communications rings with each other and to interface the resource with the communications rings, each network interface including:
      a first ring hop connected to the physical vertical communication ring passing through the network interface, and
      a second ring hop connected to the physical horizontal communication ring passing through the network interface; and
   a back pressure circuit for each physical vertical communication ring and each physical horizontal communication ring, wherein the back pressure circuit, which is directly connected to each of the M or N first and second ring hops, is operable to inform the each of the M or N first and second ring hops, respectively, on a given communication ring of an overflow condition on that given communication ring and thus prevent ring hop action to insert packets into the logical transport channel circulating on that given communication ring.

2. The network-on-chip of claim 1 wherein each ring hop includes a FIFO buffer and the overflow condition is an overflow of that FIFO buffer, the back pressure circuit signaling the overflow condition to prevent ring hop action to insert packets into the logical transport channel circulating on that given communication ring which are intended for transport to the destination whose FIFO buffer is in overflow condition.

3. The network-on-chip of claim 1 wherein the resources comprise integrated circuit resources.

4. The network-on-chip of claim 3 wherein the integrated circuit resources comprise input/output circuits, memory circuits, and processing circuits.

5. The network-on-chip of claim 1 wherein the logical transport channel has a header portion and a payload portion within which the packet is contained.

6. The network-on-chip of claim 5 wherein the logical transport channel flows in a cyclic manner through the communication ring without interruption.

7. The network-on-chip of claim 5 wherein each ring hop functions to insert packets into the payload portions of the logical transport channels and extract packets from the payload portions of the logical transport channels.

8. The network-on-chip of claim 5 wherein the logical transport channel has a size which spreads over multiple ring hops on the communications ring.

9. The network-on-chip of claim 1 wherein each of the network interfaces comprises a first FIFO buffer to store packets at an interface between the resource and the network interface and wherein each ring hop includes a second FIFO buffer to store packets at an interface between the ring hop and the network interface.

10. The network-on-chip of claim 9 wherein each of the network interfaces further comprises a selector network that selectively interconnects the first FIFO buffer to the second FIFO buffers of the ring hops to support packet transfer between the resource and the ring hops, and further selectively interconnects second FIFO buffers of the ring hops to support packet transfer between ring hops.

11. The network-on-chip of claim 1 further comprising a request circuit for each physical vertical communication ring and each physical horizontal communication ring, the request circuit operable to issue a request signal informing the each of the M or N first and second ring hops, respectively, on a given communication ring that a packet needs to be sent by one ring hop and inhibiting other ring hops from using the given communication ring.

12. The network-on-chip of claim 11 wherein the request circuit further supports the making of a reservation by the one ring hop to use the given communication ring.

13. The network-on-chip of claim 11 wherein the request circuit issues the request signal only following failure of the one ring hop from gaining access to the given communication ring after a certain number of unsuccessful access attempts.

* * * * *